United States Patent
Johnson et al.

(10) Patent No.: US 6,409,924 B1
(45) Date of Patent: *Jun. 25, 2002

(54) METHOD FOR REMOVING OIL FROM WATER

(75) Inventors: Michael R. Johnson, Mandeville; Jeffrey J. Smith, New Orleans, both of LA (US)

(73) Assignee: AMCOL International Corporation, Arlington Heights, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/674,340
(22) PCT Filed: May 14, 1999
(86) PCT No.: PCT/US99/10759
§ 371 (c)(1), (2), (4) Date: Apr. 2, 2001
(87) PCT Pub. No.: WO99/58218
PCT Pub. Date: Nov. 18, 1999

Related U.S. Application Data

(63) Continuation-in-part of application No. 09/081,976, filed on May 14, 1998, now Pat. No. 5,935,444.

(51) Int. Cl.[7] .............................. B01D 17/02; C02F 1/28
(52) U.S. Cl. ...................... 210/691; 210/808; 210/924
(58) Field of Search .................. 210/747, 170, 210/691, 924, 804, 808, 680, 266, 287; 166/357

(56) References Cited

U.S. PATENT DOCUMENTS

| | | | | |
|---|---|---|---|---|
| 4,678,577 A | * | 7/1987 | Thomas et al. .............. | 210/441 |
| 5,286,383 A | * | 2/1994 | Verret et al. ................. | 210/540 |
| 5,314,420 A | * | 5/1994 | Smith et al. ................. | 210/691 |
| 5,567,318 A | * | 10/1996 | Beall ........................... | 210/691 |
| 5,922,206 A | * | 7/1999 | Darlington, Jr. et al. .... | 210/693 |
| 5,935,444 A | * | 8/1999 | Johnson et al. .............. | 210/691 |
| 6,235,201 B1 | * | 5/2001 | Smith et al. ................. | 210/691 |

FOREIGN PATENT DOCUMENTS

| EP | 0787688 A | * | 8/1997 |
|---|---|---|---|
| WO | WO 8202496 A | * | 8/1982 |
| WO | WO 8301205 A | * | 4/1983 |
| WO | WO 9524963 A | * | 9/1995 |

* cited by examiner

*Primary Examiner*—Duane Smith
*Assistant Examiner*—Frank M. Lawrence
(74) *Attorney, Agent, or Firm*—Marshall, Gerstein & Borun

(57) ABSTRACT

System in fluid communication with an oil-contaminated water supply, such as a water leg portion of an offshore drilling or production platform sump tank, for conveying the separated water into contact with an organophilic clay in a vessel maintained at an operating pressure of at least 10 psig, such that the hydrocarbons and other organic material will be adsorbed onto the organophilic clay and will be conveyed back to the ocean water without contamination.

6 Claims, 3 Drawing Sheets

METHOD FOR REMOVING OIL FROM WATER

CROSS-REFERENCE TO RELATED APPLICATION

This application is a 371 of PCT Application No. PCT/US99/10759 filed May 14, 1999, which is a continuation-in-part of U.S. application Ser. No. 09/081,976 filed May 14, 1998, no U.S. Pat. No. 5,935,444.

FIELD OF THE INVENTION

The present invention is directed to an apparatus and method for removing oil, hydrocarbons and other organic materials from water, particularly industrial waste waters, ship bilge pump waters, and rainwater, collected on offshore oil drilling and production platforms. In accordance with the principles of the present invention, the organics are removed from water surprisingly efficiently by pressurized contact with an organophilic clay to achieve new and unexpected adsorption of the organics by the organophilic clay. More particularly, the present invention is directed to an apparatus and method that includes relatively crude, gravity separation of oil from water and then contacting the separated water, containing a small amount of hydrocarbons, such as oil and grease, with an organophilic clay, at a pressure of at least 10 psig, to purify the water. Surprisingly, the organophilic clay becomes a much more effective oil-adsorbent at contaminated water pressures higher than atmospheric.

BACKGROUND OF THE INVENTION AND PRIOR ART

Offshore drilling and production platforms used for recovering oil from subterranean structure disposed beneath ocean water includes a number of structural support legs for supporting a plurality of work deck areas at substantial heights above the water level, e.g., disposed about 40 to about 100+ feet above sea level. During the recovery of oil at one or more of these work deck areas, oil, grease and other hydrocarbons are unavoidably spilled onto the deck area(s) and it is not permissible to discard these hydrocarbons into the ocean water. Such work deck areas or platform surfaces are constructed to be fluid-impermeable in order to contain the spilled hydrocarbons on the work deck areas. These hydrocarbons, such as recovered oil, grease, surfactants and other organic contaminants, are directed from the work deck or platform areas, either by water washing or rainwater, into a sump pump container or sump tank where the water and oil separate by gravity such that the water can be removed from a lower portion of the sump tank, for conveyance back to the ocean, and the oil can be pumped from an upper portion of the sump tank into an oil recovery container so that the oil is not returned to the ocean.

These contained deck areas on offshore structures collect a significant amount of water during periods of high rainfall. The rainwater and entrained hydrocarbons, particularly recovered oil, grease and surfactants, are conveyed to the sump tank or collection tank through a gravity drain system from each of the work deck areas. These sump tanks rely on retention time as the primary oil/water separation mechanism in order to skim the lighter hydrocarbons from a top of the sump tank so that the water can be returned to the ocean.

The sump tanks presently used on offshore platforms suffer from a number of major drawbacks which result in significant amounts of hydrocarbons, particularly oil, paraffins, grease, and refined hydrocarbons being returned to the ocean causing significant ecological contamination. One major drawback of the presently used sump tanks is that they are designed for a maximum of about three inches of rainwater per hour. It has been found that it is not uncommon to experience eight to ten inches of rainfall per hour in areas such as the Gulf of Mexico. Another major drawback of the sump tanks presently used on offshore drilling platforms is that a tank containing a layer of oil disposed above a layer of water will lose the water by evaporation over an extended dry period and the oil layer, as a result, will coat the inside surfaces of the sump tank such that water generated from even a modest rain shower, after this drying period, carries the oil through a water leg or drain portion of the sump tank as the water initially washes lower inner surfaces of the sump tank, thereby carrying the coated oil to the ocean.

In accordance with the present invention, the above-described drawbacks of a sump tank system for separation of water from oils and other hydrocarbons have been eliminated by the apparatus and method of the present invention wherein the sump tank water is conveyed for contact with an organophilic clay for final separation of hydrocarbons such as oil and paraffins from the water collected on the work deck areas of an offshore drilling platform.

SUMMARY OF THE INVENTION

In brief, the present invention is directed to apparatus in fluid communication with a water leg portion of an offshore drilling platform sump tank for conveying the separated water into contact with an organophilic clay such that the hydrocarbons and other organic materials commingled with the sump tank water will be adsorbed onto the organophilic clay and the water will pass through the clay and will be conveyed back to the ocean water without contamination.

Accordingly, one aspect of the present invention is to provide a new and improved method and apparatus for complete separation of oil from water admixed on an offshore oil well drilling platform so that the separated water can be returned to the ocean without ocean contamination.

Another aspect of the present invention is to provide a new and improved method and apparatus for separation of oil and water including a first gravity separation step that provides for separation of water and oil by settling to provide layering of the water in a layer below an oil layer and then draining the lower water layer from the upper oil layer, and thereafter directing the separated water layer through a vessel containing an organophilic clay for pressurized contact with the organophilic clay, at a pressure of above atmospheric, preferably at least 10 psig above atmospheric, for removal (adsorption) of remaining hydrocarbons entrained with the drained water layer.

The data of Table I show that at atmospheric pressure and up to less than 10 psig water pressure entering the organophilic clay-containing vessel (corresponding to the sump tank and organophilic clay-containing vessel both disposed at approximately platform level) the effluent is cloudy and contains detectable levels of oil:

TABLE I

EFFECT OF PRESSURE ON OIL ADSORPTION BY ORGANOPHILIC CLAY

| Pressure | Influent Concentration and Color | Oil Concentration via EPA Method 413.1 | Color of Effluent |
| --- | --- | --- | --- |
| Atmospheric | 100 ppm, dark | 27 ppm | Cloudy, dark |
| 1 psig | 100 ppm, dark | 26 ppm | Cloudy, dark |
| 2 psig | 100 ppm, dark | 24 ppm | Cloudy, dark |
| 3 psig | 100 ppm, dark | 22 ppm | Cloudy, dark |
| 4 psig | 100 ppm, dark | 21 ppm | Cloudy, light |
| 5 psig | 100 ppm, dark | 20 ppm | Cloudy, light |
| 10 psig | 100 ppm, dark | 12 ppm | Clear |
| 15 psig | 100 ppm, dark | 8 ppm | Clear |
| 20 psig | 100 ppm, dark | 4 ppm | Clear |
| 25 psig | 100 ppm, dark | 1 ppm | Clear |
| 30 psig | 100 ppm, dark | 1 ppm | Clear |
| 35 psig | 100 ppm, dark | Non detect | Clear |
| 40 psig | 100 ppm, dark | Non detect | Clear |
| 45 psig | 100 ppm, dark | Non detect | Clear |
| 50 psig | 100 ppm, dark | Non detect | Clear |

It is quite unexpected that oil contaminants from oil-contaminated water can be adsorbed more completely with an organophilic clay if the water enters an organophilic clay-containing vessel at increased pressure.

The above and other aspects and advantages of the present invention will become more apparent from the following detailed description of the preferred embodiment read in conjunction with the drawings.

DETAILED DESCRIPTION OF THE DRAWINGS

Figure 1:
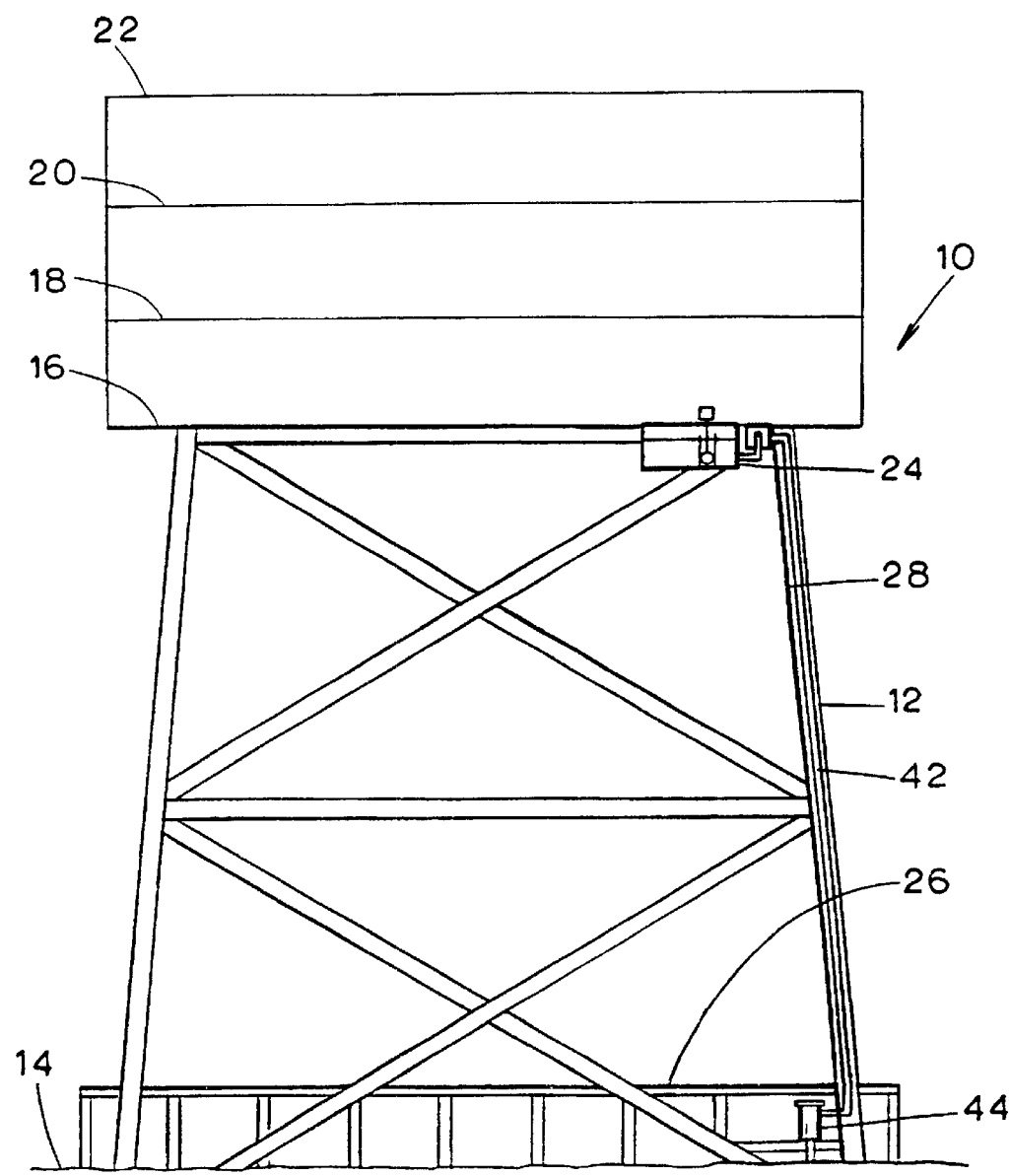
FIG. 1 is a side view of an offshore oil well drilling platform generally showing the oil and water separating apparatus and method of the present invention attached to platform support structure with prior art placement of a sump tank shown in dashed lines.

Turning now to the drawings, and initially to FIG. 1, there is shown an offshore drilling platform generally designated by reference numeral 10, including a work deck support structure 12 for supporting a plurality of stacked work decks at a substantial height above an ocean water level 14. The work decks commonly include a cellar deck 16 at a lowest work deck level, a second deck 18 located directly above the cellar deck 16, a third deck 20 disposed directly above deck 18, and a main deck 22 at an uppermost work deck level.

In accordance with the preferred embodiment of the present invention, a sump tank 24 or 24A is connected to the drilling platform 10 at the cellar deck level 16, and rainwater, including entrained hydrocarbons, particularly oil, paraffins and surfactants are directed from all deck levels, which are contained so that rainwater and entrained hydrocarbons do not spill over to the ocean, to drain by gravity into the sump tank 24. As explained above, the sump tank has not been effective for adequate separation and recovery of hydrocarbons from rainwater. It has been found that further separation of hydrocarbons from rainwater is required for effective elimination of ocean water contamination by providing a secondary hydrocarbon recovery apparatus and method for further treatment of the rainwater separated by gravity in the sump tank 24.

Water and entrained hydrocarbons are conveyed via conduit 28 from the deck areas 16, 18, 20 and 22 along the platform infrastructure or support leg 12 to the sump tank 24 or water/oil separation apparatus of the present invention.

In accordance with a preferred embodiment of the present invention, it has been found that the apparatus and method of the present invention function best when the oil-contaminated water treated in the organophilic clay containing vessel is pressurized above atmospheric pressure, preferably to at least about 10 psig, while in contact with the organophilic clay. In accordance with an important feature of the present invention, when the contaminated water is pressurized to at least 10 psig, the effluent sent back to the ocean is clear (not cloudy) and has surprisingly less remaining oil as a result of pressurized contact of the oil-containing water with the organophilic clay.

Pressurized contact of the oil-containing water with the organophilic clay can be accomplished in a number of ways. The preferred method of establishing pressurized contact of oil-contaminated water with the organophilic clay, when used on an offshore drilling platform, is by placement of sump tank 24 at the cellar deck level 16, and by securing the organophilic clay containing cartridge 44 at or near the boat landing deck level 26 (such that at least a portion of the organophilic clay-containing cartridge 44 is within about 10 feet of ocean level). Oil and other hydrocarbons collected on the production decks 16, 18, 20 and 22 that may accumulate during dry weather on the inner surfaces of the conduit 28 and inner surfaces of sump tank 24 can be separated from the water that flows from the decks to the organophilic clay-containing cartridge 44 for recovery and separation in accordance with the apparatus and method of the present invention.

Other expedients for establishing pressure within the organophilic clay-containing cartridge include installing a valve 47 or other restrictions in the effluent conduit 48.

Figure 2:
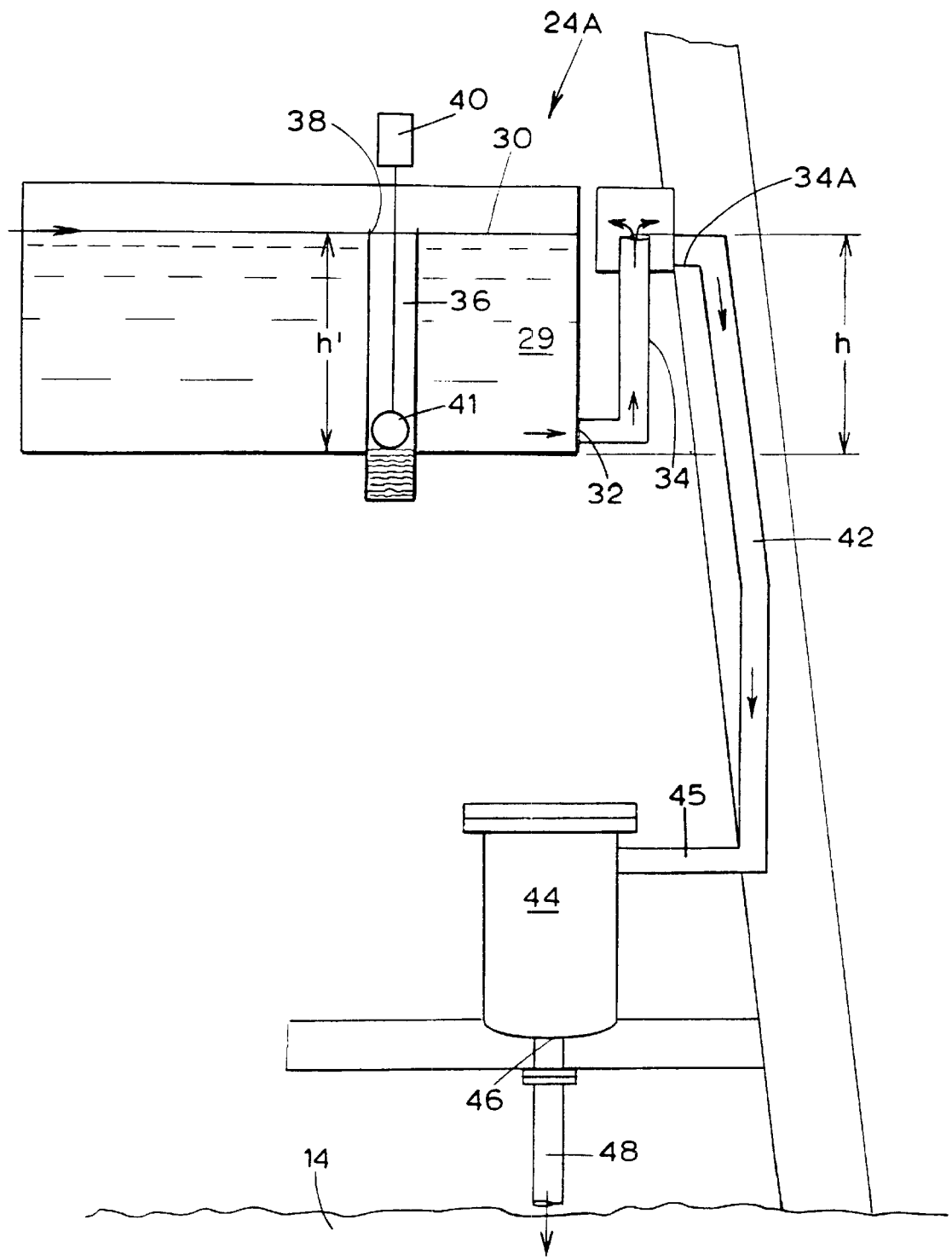
FIG. 2 is a side view of the oil and water separating apparatus and method of the present invention.

Turning now to FIG. 2, there is shown the preferred embodiment of the hydrocarbon separation apparatus of the present invention that includes a gravity separation sump tank 24, disposed at the cellar deck level 16, for gravity separation of a lower level of water 29 from a floating layer of oil 30. The water 29 is conveyed through a water outlet 32 disposed near a bottom of the sump tank 24 through a water leg 34, preferably in the shape of an inverted U. The water leg 34 achieves gravity flow of water through the water leg 34 only when the level of water within the sump tank 24 reaches height h, above an uppermost or base portion 34A of water leg 34. The sump tank 24 includes an inner, contained float valve housing 36 open at its top 38 for receiving oil from oil level 30 when the level of liquid within the sump tank 24 reaches height h'. Float valve 40 is disposed within inner housing 36 and is connected to a pump (not shown) for pumping oil into an oil recovery vessel when a floating ball portion 41 of float valve 40 rises to a predetermined level within inner valve housing 36 as a result of oil entering inner vessel 36 when the liquid level h' is reached within sump tank 24. While h and h' are shown to be approximately equal, h may be smaller than h' in order to achieve water removal without oil pumping, as well known in the art.

In accordance with an important feature of the present invention, a downwardly extending leg portion 42 of water leg 34 is operatively interconnected to, and in fluid communication with, the sump water polishing unit 44 containing a volume of oil adsorbent, particularly an organophilic clay. The separated water flows by gravity through water leg conduit 42 positioned, in one embodiment, at least 1.6 feet, preferably at least 2 feet, more preferably at least 10 feet below the sump tank 24 to provide at least 10 psig water pressure within the polishing unit 44. The oil-contaminated water is conveyed by gravity through conduit 44 into sump water polishing unit 44 containing organophilic clay. The organophilic clay within sump water polishing unit 44 adsorbs the hydrocarbons, oil and other organic materials entrained with the water flowing through conduits 42 and 44 for essentially complete hydrocarbon removal (less than about 10 parts per million, preferably less than about 1 part per million organics after organophilic clay treatment). The treated water flows by gravity through water exit opening 46 in the sump water polishing unit 44 and through exit conduit 48 back to the ocean water 14.

Exit conduit 48, in another embodiment, includes a valve or permanent narrowing 47—as an alternative expedient for maintaining water pressure within the polishing unit cartridge 44.

Figure 3:
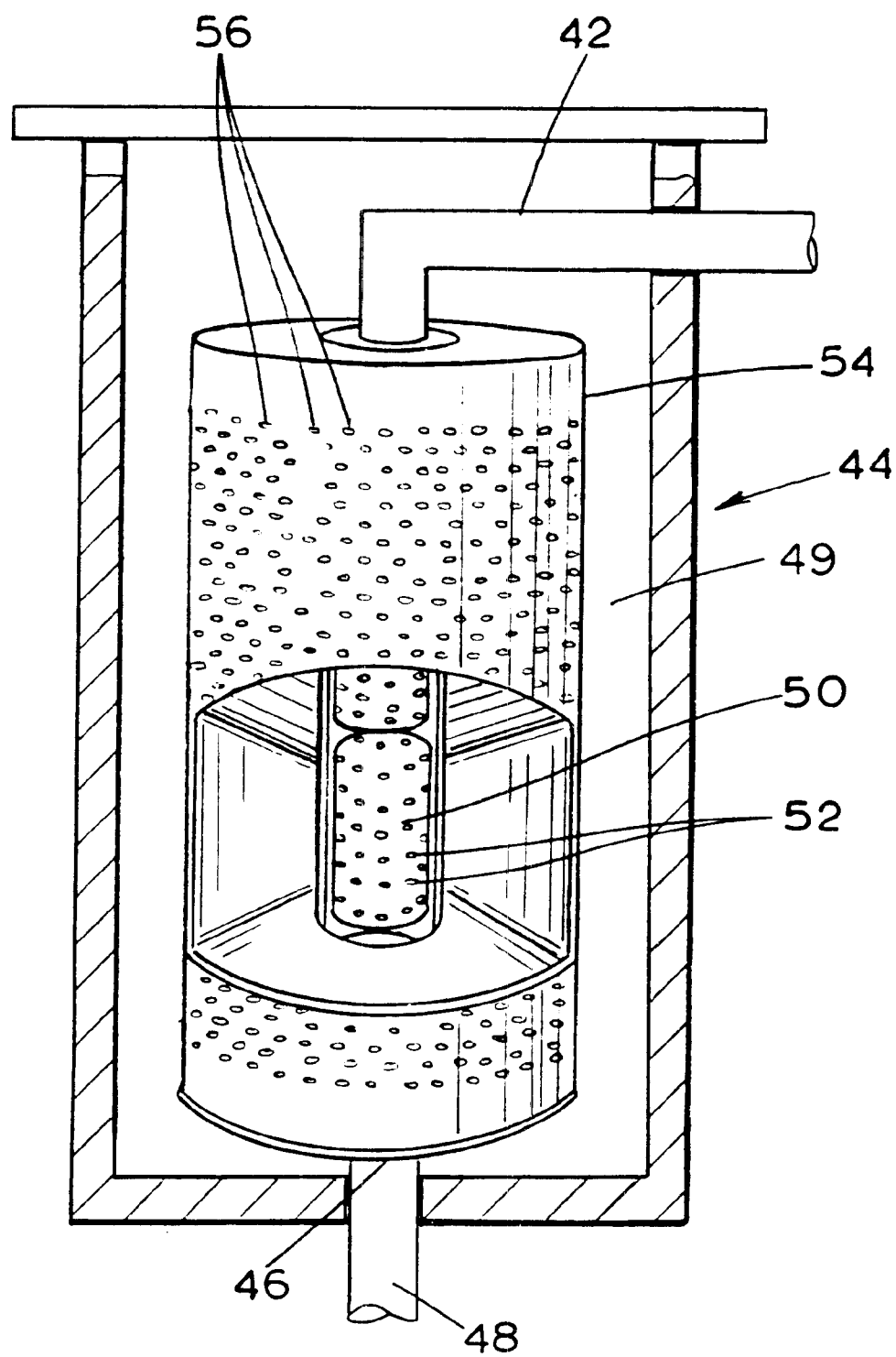
FIG. 3 is a partially broken way, perspective view of a preferred embodiment of a water/organophilic clay contact vessel for efficient contact of water with an organophilic clay contained therein.

As shown in FIG. 3, the sump water polishing unit 44 includes an outer, fluid-impermeable housing 49 having a water inlet 42 interconnected through the housing 49 so that contaminated water enters the polishing unit 44 and then enters an organophilic clay-containing vessel or cartridge 54, through a plurality of apertures 56. The organophilic clay-containing cartridge 54 is water-permeable by virtue of the water flow apertures 56 that are sized sufficiently small such that organophilic clay granules do not pass therethrough. Water entering the polishing unit 44 through water inlet conduit 42 and apertures 56 flows radially inwardly into a longitudinal, axial, central conduit 50 containing apertures 52 for receiving the organophilic clay-treated water. Organophilic clay contained in cartridge 54 adsorbs any oil and organics contained in the water and the clean water exits through exit opening 46 and is returned to the ocean via conduit 48.

Organphilic Clay

The terms "organophilic clay" and "organoclay" are used herein interchangeably to refer to various types of clay, e.g., smectites, that have organoammonium ions substituted for cations between the clay layers. The term "organoammonium ion substituted" refers to a substituted ammonium ion in which one or more hydrogen atoms are replaced by an organic group. The organoclays are essentially solid compounds that have an inorganic and an organic phase.

The preferred clay substrates for use in this invention are the smectite-type clays, particularly the smectite-type clays that have a cation exchange capacity of at least 75 milliequivalents per 100 grams of clay. Useful clays for such purpose include the naturally occurring Wyoming variety of swelling bentonite and similar clays, and hectorite, which is a selling magnesium-lithium silicate clay. The clays are preferably converted to the sodium form if they are not already in this form. This can be effected by a cation exchange reaction with a soluble sodium compound. These methods are well-known in the art. Smectite-type clays prepared synthetically can also be utilized, such as montmorillonite, bentonite, beidelite, hectorite, saponite, and stevensite.

The organoclays useful in this invention also include those set forth in U.S. Pat. No. 2,531,427 to Hauser. These organoclays are modified clays which exhibit inorganic liquid, some of those characteristics that untreated clays exhibit in water. For example, they will swell in many organic liquids and will form stable gels and colloidal dispersions.

Generally, the quaternary ammonium salt substituted onto the clay has organic groups attached to the clay that will range from aliphatic hydrocarbon of from 1 to 24 carbons to aromatic organic molecules, such as benzyl groups that could have a host of groups substituted on the benzyl ring. The number of benzyl versus straight chain hydrocarbons substituted on the ammonium ion can vary from 3 to 0 aromatic substituents per aliphatic substituent (i.e., dimethyl dioctdodecyl 0:2, methyl benzyl dioctododecyl 1:2, dibenzyl dioctobenzyl 1:1, tribenzyl octadecyl 3:1, and methyl dibenzyl octodecyl 2:1). The amount of quaternary ammonium salt substituted on the clay can vary between 0.5% to 50% by weight.

Preferred organoclays useful in the invention comprises one or more of the following types of quaternary ammonium cation-modified montmorillonite clays:

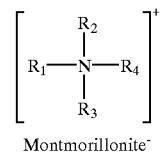

Montmorillonite⁻ wherein $R_1$, is an alkyl group having at least 10 carbon atoms and up to, for example, 24 atoms, and preferably having a chain length of from 12 to 18 carbon atoms; $R_2$ is hydrogen, benzyl, or an alkyl group of at least 10 carbon atoms and up to, for example, 24 carbon atoms, and preferably from 12 to 18 carbon atoms; and $R_3$ and $R_4$ are each hydrogen or lower alkyl groups, i.e., they contain carbon chains of from 1 to 4 atoms, and preferably are methyl groups.

Other organoclays utilizable in the invention include benzyl organoclays such as dimethyl benzyl (hydrogenated tallow) ammonium bentonite; methyl benzyl di(hydrogenated tallow) ammonium bentonite; and more generally quaternary ammonium cation modified montmorillonite clays represented by the formula:

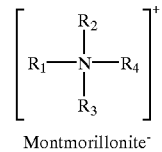

Montmorillonite⁻ wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms, and most preferably wherein 20% to 35% of said long chain allyl radicals contain 16 carbon atoms and 60% to 75% of said long chain allyl radicals contain 18 carbon atoms.

The montmorillonite clays that may be so modified are the principal constituents of bentonite rock, and have the chemical compositions and characteristics described, for example, in Berry & Mason, "Mineralogy," 1959, pp. 508–509. Modified montmorillonite clays of this type (i.e., organoclays) are commercially available from Southern Clay Products, Inc., Gonzales, Tex. under such trade designations as CLAYTONE 34 and 40, and are available from NL Industries, Inc., New York, N.Y. under such trade designations as BENTTONE 27, 34, and 38. Other organoclays useful in the invention are the higher dialkyl dimethyl ammonium organoclays such as dimethyl di(hydrogenated tallow) ammonium bentonite; the benzyl ammonium organoclays, such as dimethyl benzyl (hydrogenated tallow) ammonium bentonite; and ethylhydroxy ammonium organoclays such as methyl bis(2-hydroxyethyl)octodecyl ammonium bentonite.

What is claimed is:

1. A method of separating water from a combination of water and oil comprising:

collecting the oil and water in a settling vessel and allowing the oil and water to settle to form a lower water layer and an upper oil layer, said lower water layer including an oil contaminant;

draining a portion of the water layer from said settling vessel;

treating said drained portion of the water layer by flowing said drained portion of said water layer into a vessel containing an organophilic clay, said water being at a pressure of at least 5 psig within said vessel, for intimate contact of said drained water with said organophilic clay and adsorption of said oil contaminant on said organophilic clay; and flowing the treated water out of said organophilic clay-containing vessel.

2. The method of claims 1, wherein the pressure within the organophilic clay-containing vessel is at least 10 psig.

3. The method of claim 1, wherein the pressure within the organophilic clay-containing vessel is in the range of 5 psig to 50 psig.

4. The method of claim 2, wherein the pressure within the organophilic clay-containing vessel is in the range of 10 psig to 50 psig.

5. The method in accordance with claim 1, wherein the organophilic clay is selected from the group consisting of formula (I), formula (II), and mixtures thereof:

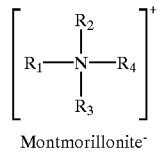

Montmorillonite$^-$ wherein $R_1$ is an alkyl group having at least 10 carbon atoms and up to, for example, 24 atoms, and preferably having a chain length of from 12 to 18 carbon atoms; $R_2$ is hydrogen, benzyl, or an alkyl group of at least 10 carbon atoms and up to, for example, 24 carbon atoms, and preferably from 12 to 18 carbon atoms; and $R_3$ and $R_4$ are each hydrogen or lower alkyl groups containing carbon chains of from 1 to 4 atoms;

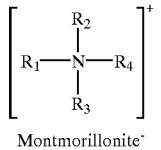

Montmorillonite$^-$ wherein $R_1$ is $CH_3$ or $C_6H_5CH_2$; $R_2$ is $C_6H_5CH_2$; and $R_3$ and $R_4$ are alkyl groups containing long chain alkyl radicals having 14 to 22 carbon atoms.

6. The method in accordance with claim 5, wherein 20% to 35% of said $R_3$ and $R_4$ radicals contain 16 carbon atoms and 60% to 75% of said $R_3$ and $R_4$ radicals contain 18 carbon atoms.

* * * * *